United States Patent
Labana

[15] 3,676,405
[45] *July 11, 1972

[54] THERMOSET RESINS WITH HYDROXY ACRYLATE, METHYL METHACRYLATE AND BLOCKED ISOCYANATE

[72] Inventor: Santokh S. Labana, Dearborn Heights, Mich.

[73] Assignee: Ford Motor Company, Dearborn, Mich.

[ * ] Notice: The portion of the term of this patent subsequent to May 2, 1989, has been disclaimed.

[22] Filed: June 5, 1970

[21] Appl. No.: 43,894

[52] U.S. Cl. ............... 260/77.5 CR, 252/182, 260/37 N, 260/77.5 TB
[51] Int. Cl. ........................................... C08q 22/06
[58] Field of Search ............. 260/77.5 CR, 77.5 TB; 252/182

[56] References Cited

UNITED STATES PATENTS

| | | | |
|---|---|---|---|
| 3,245,941 | 4/1966 | Mayer et al. | 260/77.5 |
| 3,441,541 | 4/1969 | D'Amcicco | 260/77.5 |
| 3,028,367 | 4/1962 | O'Brien | 260/77.5 |
| 3,178,380 | 4/1965 | Basel | 260/77.5 |

*Primary Examiner*—Donald E. Czaja
*Assistant Examiner*—M. J. Welsh
*Attorney*—John R. Faulkner and Olin B. Johnson

[57] ABSTRACT

Novel thermosetting resin powders which can be molded to form products characterized in tensile measurement, by high elongation-to-break, high tensile strength and modulus and a high glass transition temperature are prepared from a mixture of (a) a prepolymer formed by reacting (1) hydroxy ester of acrylic or methacrylic acid and a $C_2 - C_3$ diol with (2) methyl methacrylate and (b) a blocked di- or triisocyanate wherein the isocyanate groups are directly attached to an aromatic ring and deblock at temperatures in the range of about 120° to 160° C.

20 Claims, 1 Drawing Figure

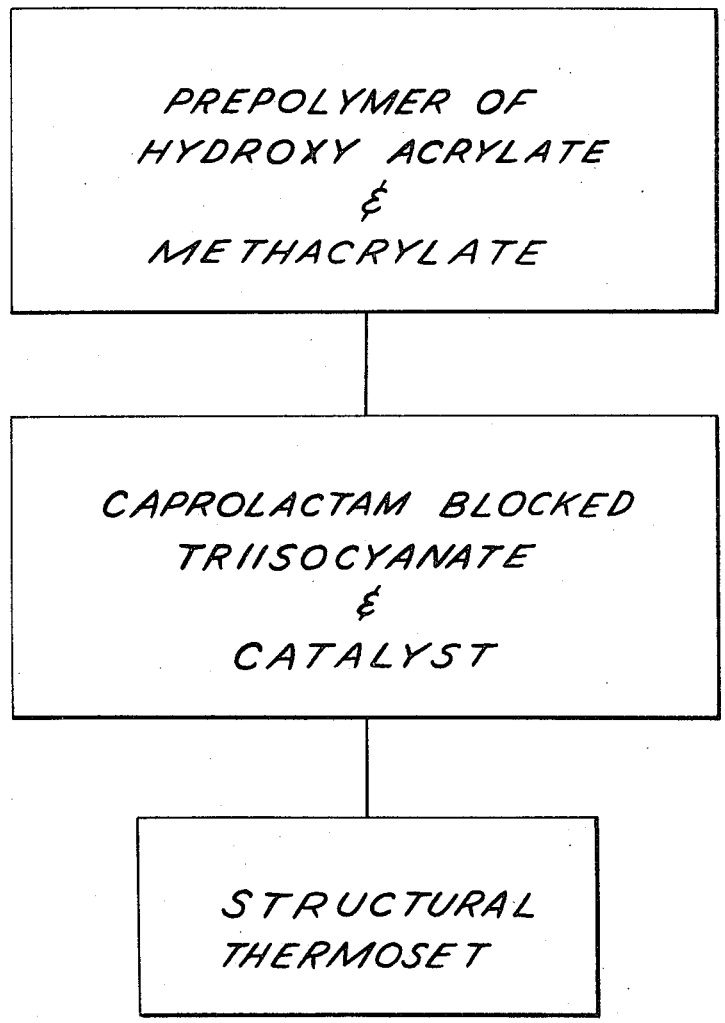

THERMOSET RESINS WITH HYDROXY ACRYLATE, METHYL METHACRYLATE AND BLOCKED ISOCYANATE

THE INVENTION

This invention relates to self-crosslinking, dry, thermosettable molding powders suitable for rapid curing processing as by compression and injection molding and applicable to the production of rigid, tough, structural materials as, for instance, automobile body panels, electrical appliance housings, boat construction, storage tanks, conduits, particularly those for the transmission of heated fluids, etc. and to molded articles produced therefrom.

The thermosets of this invention, after molding, have a glass transition temperature above about 90° C., and preferably above 105° C. At room temperature (20° – 25° C.) these moldings exhibit, in tensile measurement, a strength in the range of about 5,000 to about 10,000 psi or higher, a modulus in the range of about 400,000 to about 600,000 psi or higher, and elongation-to-break in the range of about 3 to about 12 percent or higher.

Glass transition temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g., about 1 cycle per second.

I. Composition of the Prepolymer

The prepolymer, except for limited substitution as hereinafter noted, is a copolymer of the following basic composition:

| | |
|---|---|
| Hydroxy Acrylate | 25–40 Wt. % |
| Methylmethacrylate | balance |

The hydroxy acrylate component is a hydroxy ester of acrylic or methacrylic acid and a $C_2 - C_3$ diol, e.g., hydroxy ethyl acrylate, hydroxy ethyl methacrylate, hydroxy propyl methacrylate, and hydroxy propyl acrylate. A minor portion of the methyl methacrylate may be replaced with acrylonitrile or methacrylonitrile, preferably the latter, to increase the strength of the moldings made therefrom. If styrene is substituted for a portion of the methyl methacrylate component, it should not exceed about 10 percent of the same. Other acrylates and methacrylates are unsuitable for this purpose. In the preferred embodiment, the hydroxy ester component comprises about 30 to about 36 weight percent of the prepolymer.

II. Properties of the Prepolymer

The prepolymer has an average molecular weight in the range of about 3,000 to about 16,000, preferably about 6,000 to about 12,000. Less than about 5 percent of the molecules thereof should have molecular weight below about 1,000.

The prepolymer has a softening point in the range of about 110° to about 170° C.

III. Preparation of the Prepolymer

The prepolymer is advantageously formed by solution polymerization using heat, a free radical initiator, and an inert solvent. The polymer is preferably recovered by coagulation. Hexane, a mixture of hexane and toluene, etc., are suitable for this purpose.

A free radical initiator is dissolved in the combined monomeric reactants and is advantageously employed in an amount equal to about 159 – 4 wt. % of the combined monomer weight. Conventional free radical initiators are suitable for this purpose, e.g., acylperoxides, peresters, and azo compounds. Specific materials which have been used successfully include 2,2' - azobis (2-methyl propionitrile), hereinafter termed AIBN, benzoyl peroxide, hereinafter termed BPO, t-butyl perbenzoate and t-butylperoxypivalate.

As aforementioned, the reaction is carried out in an inert solvent, e.g., dioxane, methyl ethyl ketone, etc. Advantageously the weight of the solvent is equal to or in excess of the combined weight of the reactant and the initiator.

In a preferred method of preparation, the monomeric reactants and the free radical initiator are added in small increments, e.g., dropwise, to the solvent heated to reflux under nitrogen. When addition is complete, initiator in the amount of about 0.1 percent monomer weight is dissolved in a small amount of solvent and added over a period of 20 to 60 minutes. The reflux is then continued for about 2 hours. The prepolymer is then recovered by coagulation. This is preferably effected in the following manner: The reaction solution is further diluted with additional solvent until the prepolymer comprises about 20 – 30 wt. % of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation, the prepolymer can be formed by the well-known techniques of emulsion polymerization, bulk polymerization and suspension polymerization.

IV. Crosslinking Agent

The crosslinking agent used in this invention is a di-or triisocyanate wherein the isocyanate groups are directly attached to an aromatic ring and are blocked by a blocking agent which deblocks to give free isocyanate at a temperature in the range of about 120° to 160° C. The blocking agent used must be non-volatile at molding temperature. Caprolactam (b.p. 232° C.) is a preferred blocking agent.

A preferred crosslinking agent is caprolactam-blocked triphenyl dimethylene triisocyanate which is characterized by the following formula:

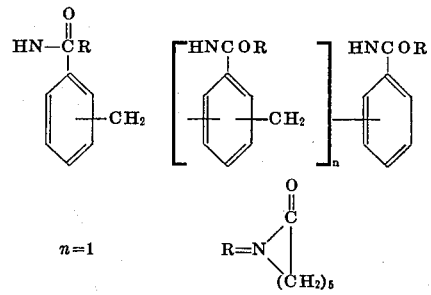

$$n=1 \quad R=N\begin{matrix}C=O \\ (CH_2)_5\end{matrix}$$

This material is commercially available (Isonate 123 P — The Upjohn Company, Kalamazoo, Michigan) in the form of a powder which has the following typical analysis:

| | |
|---|---|
| Equivalent weight | 246 |
| Softening point, °C. | 90 |
| Melting point, °C. | 130 |
| Viscosity at 156°C., cps | 1000 |

Other di- and triisocyanates which are suitable for use as crosslinking agents when blocked with caprolactam are toluene diisocyanate, methylene diphenyl diisocyanate, the triisocyanate obtained by reacting 3 moles of toluene diisocyanate with 1 mole of trimethylol propane, etc. The blocking of isocyanates with caprolactam is well known in the art and can be effected by blending the two materials with a suitable catalyst, e.g., triethylene diamine, in refluxing toluene.

Unblocked isocyanates effect crosslinking during the drying process and are not suitable for use in these molding powders. The usual blocking agents such as phenol, cresol, 2-butanol or furfural alcohol cannot be used because of their volatility.

The crosslinking agent is advantageously employed in sufficient quantity to provide about 0.90 to about 1.10, preferably about 0.95 to about 1.05, blocked isocyanate groups for each hydroxy group in the molding powder.

V. Catalyst 2.2.2]

A catalyst is employed in the molding powder mix in the amount of about 0.1 to about 1 percent (basis weight of molding powder mix) to facilitate the crosslinking reaction. Catalysts used for this reaction are triethylene diamine, i.e., Diazabicyclo [2.2.2] octane, hereinafter referred to as DABCO, triethylamine, N-methyl morpholine, organometallic compounds such as stanneous octoate, tetraphenyl tin, dibutyl tin dilaurate, and inorganic compounds such as bismuth nitrate, stannic chloride and ferric chloride.

VI. Additive

It is within the scope of this invention to employ in the molding powder mix about 1.0 to about 10, preferably about 3 to about 7, weight percent (basis weight of molding powder mix) of a hydroxylated reactive diluent having molecular weight below about 1,000 and having at least two free hydroxyl groups. Suitable hydroxylated diluents include hydroxy terminated liquid polyesters, monomeric diols, e.g., ethylene glycol, low (200 – 1000) molecular weight polyethylene glycols, etc.

It is also within the scope of this invention to employ up to about 1 weight percent (basis weight of molding powder mix) of processing aids, e.g., zinc stearate, hydrocarbon wax, etc.

VII. Preparation of the Molding Powder Mix

The powdered prepolymer, the crosslinking agent, the catalyst, and the reactive or unreactive plasticizer, when used, are dissolved in a suitable solvent, e.g., acetone, benzene, etc., and the solution is thoroughly stirred. The solvent is evaporated under vacuum leaving a rigid foam which is crushed to a fine powder. The powder is further dried under vacuum so that it contains less than one percent of the solvent.

Alternatively, to the prepolymer solution as obtained by polymerization are added crosslinking agent, reactive diluent, if any, and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, cross-linking agent, additives and catalyst and homogenizing by passing through an extrusion mixer or a roll mill.

If desired, reinforcing fillers such as asbestos, glass fibers, clay, calcium carbonate, calcium silicate, etc., may also be incorporated in the molding powders. These fillers are useful to increase the strength, modulus and heat distortion temperature of the finished product.

The powders thus prepared are suitable for use in injection molding, compression molding, and transfer molding.

This invention will be more fully understood from the following illustrative examples wherein tensile properties of the molded specimens are determined by Tensile Test, American Society of Testing & Materials — D 638 (1961) with the overall sample length at 2 inches and the parallel guage section at one-half inch.

The prepolymers in the foregoing examples have softening points between about 110° and about 170° C. The average molecular weights of the prepolymers in the foregoing examples are above about 3,000 molecular weight and below about 16,000 with less than 5 percent of the molecules below 1,000.

EXAMPLE I

In the following separate tests, the following procedure of preparation and test are used.
1. mix monomers for prepolymer with reaction initiator.
2. drop mixture (1) slowly into equal amount of refluxing dioxane under nitrogen atmosphere with stirring.
3. when addition (2) is complete add 0.1 percent initiator (basis weight of reactants) in 15 ml dioxane to the stirred reaction mix (2).
4. continue heating of the reaction mix for 2–3 hours.
5. dilute reaction mix to 30 percent solids with dioxane.
6. coagulate prepolymer in 5 – 7 volumes hexane.
7. recover prepolymer precipitate and dry same at 60° C. under vacuum for 8 hours.
8. mix resultant prepolymer powder with crosslinking agent and catalysts in acetone.
9. evaporate acetone under vacuum.
10. mold (pressure 1,500 psi).

The materials for preparing the moldings and the tests results of such moldings are set forth in the following table:

TABLE I.—MOLDINGS AND PROPERTIES THEREOF

| Number | Prepolymer composition | | | | Molding powder | | | Cure | | | Properties | | |
|---|---|---|---|---|---|---|---|---|---|---|---|---|---|
| | HEMA [1] | MMA [2] g. | Other | Init. | Prepolymer, g. | Cross-linking agent, g. | Catalyst | Temp., °F. | Time, min. | $T_s$,[4] p.s.i. | $T_e$,[3] percent | $T_m$,[6] p.s.i. | GTT,[7] °C. | P.C.[3] GTT,[7] °C. |
| 1 | 39 g.—(15%) | [9] 300 | | 9.8 g.—BPO [10] | 50 | 14.2 | 0.3 g.—DABCO [11] | 360 | 10 | 4,500 | 5 | 370,000 | 62 | |
| 2 | 67 g.—(24.6%) | 205 | | 4.0 g.—AIBN [12] | 50 | 14.8 | do | 360 | 10 | 6,900 | 8.5 | 620,000 | 95 | |
| 3 | 117 g.—(36%) | 210 | | 4.5 g.—AIBN | 50 | 34.0 | do | 360 | 10 | 6,850 | 11.5 | 600,000 | 99 | [13] 112 |
| 4 | 52 g.—(27.8%) | 80 | 55 g.—MAN [14] | 4.0 g.—AIBN | 30 | 15.7 | 0.2 g.—DABCO | 375 | 10 | 9,200 | 6.5 | 620,000 | | ([15]) |
| 5 | 260 g.—(30%) | 678 | | 16 g.—AIBN | 50 | 28.4 | 0.3 g.—DABCO | 350 | 10 | 6,500 | 11.0 | 460,000 | | [13] 110 |
| 6 | 200 g.—(30%) | 800 | | 20 g.—AIBN | 30 | 11.5 | 0.2 g.—DABCO | 375 | 10 | 8,500 | 8.5 | 390,000 | 78 | |
| 7 | 300 g.—(30%) | 600 | Styrene, 100 g.—(10%) | 20 g.—AIBN | 50.0 | 28.4 | 0.3 g.—DABCO | 375 | 15 | 5,600 | 4.0 | 580,000 | | |
| 8 | 300 g.—(30%) | 500 | 200 g.—(20%) | do | 50.0 | 28.4 | do | 375 | 15 | 7,050 | 3.5 | 570,000 | | |
| 9 | 300 g.—(30%) | 400 | 300 g.—(30%) | do | 50.0 | 28.4 | do | 375 | 15 | 4,900 | 2.8 | 536,000 | | |
| 10 | 300 g.—(30%) | 300 | 400 g.—(40%) | do | 50.0 | 28.4 | do | 375 | 15 | 4,800 | Sample too weak to test | | | |

LEGEND (1) hydroxy ethyl methacrylate
(2) methyl methacrylate (3) caprolactam blocked triphenyl dimethylene triisocyanate
(4) tensile strength
(5) tensile elongation-to-break
(6) tensile modulus
(7) glass transition temperature
(8) post cure-glass transition temperature
(9) grams
(10) benzoyl peroxide
(11) Diazabicyclo [2.2.2] octane or triethylene diamine
(12) 2,2'-azobis (2-methyl propionitrile)
(13) post cured at 160° C. for 1 hour
(14) methacrylonitrile
(15) prepolymer prepared in toluene containing 20 wt. % dioxane
(16) post cured at 160° C. for 1 hour

EXAMPLE 2

The procedures of Example 1 are repeated with the sole difference that 10 percent of the methyl methacrylate in the prepolymer is replaced with an equimolar amount of methacrylonitrile.

EXAMPLE 3

The procedures of Example 1 are repeated with the sole difference that 10 percent of the methyl methacrylate in the prepolymer is replaced with an equimolar amount of acrylonitrile.

EXAMPLE 4

The procedures of Example 1 are repeated except that 20 percent of the methyl methacrylate in the prepolymer is replaced with an equimolar amount of methacrylonitrile and dioxane is employed as the solvent.

EXAMPLE 5

The procedures of Example 1 are repeated except that 25 percent of the methyl methacrylate in the prepolymer is replaced with an equimolar amount of acrylonitrile and dioxane is employed as the solvent.

EXAMPLE 6

The procedures of Example 1 are repeated except that 32 percent of the methyl methacrylate in the prepolymer is replaced with an equimolar amount of methacrylonitrile and dioxane is employed as the solvent.

EXAMPLE 7

The procedures of Example 1 are repeated except that 45 percent of the methyl methacrylate in the prepolymer is replaced with an equimolar amount of methacrylonitrile and dioxane is employed as the solvent.

EXAMPLE 8

The procedures of Example 1 are repeated with the sole difference that the molding powder mix in each test contains 1 weight percent ethylene glycol.

EXAMPLE 9

The procedures of Example 1 are repeated with the sole difference that the molding powder mix in each test contains 3 weight percent of a liquid hydroxy terminated polyester.

EXAMPLE 10

The procedures of Example 1 are repeated with the sole difference that the molding powder mix in each test contains about 10 weight percent ethylene glycol.

EXAMPLE 11

The procedures of Example 1 are repeated with the sole difference that an equimolar amount of hydroxy ethyl acrylate is substituted for the hydroxy ethyl methacrylate in the copolymer.

EXAMPLE 12

The procedures of Example 1 are repeated with the sole difference that an equimolar amount of hydroxy propyl methacrylate is substituted for the hydroxy ethyl methacrylate in the copolymer.

EXAMPLE 13

The procedures of Example 1 are repeated with the sole difference that an equimolar amount of hydroxy propyl acrylate is substituted for the hydroxy ethyl methacrylate in the copolymer.

EXAMPLE 14

The procedures of Example 1 are repeated except that the molding powder mix contains 0.5 weight percent zinc stearate and the prepolymer has average molecular weight of about 8,000.

EXAMPLE 15

A caprolactam blocked diisocyanate is prepared in the following manner: to 1,600 grams of refluxing toluene (110° – 111° C.) are added 300 grams of 4,4'-diphenyl methane diisocyanate, 226 grams caprolactam, and 0.5 gram Diazabicyclo 2.2.2 octane. Heating is continued for 4 hours and the mix is allowed to cool. The blocked diisocyanate is isolated and recovered by filtration.

The procedures of the preceding examples are repeated with the sole difference that a reactive equivalent amount of this diisocyanate is substituted for the caprolactam-blocked triphenyl dimethylene triisocyanate.

The foregoing examples are illustrative of the invention defined in the appended claims. Those skilled in the art will be aware that modifications may be made therein without departing from the scope of the invention as set forth in the appended claims.

I claim

1. A molding powder which comprises an intimate mixture of (a) a copolymer consisting essentially of about 25 to about 40 weight percent of a monohydroxy ester of a $C_2 - C_3$ diol and acrylic or methacrylic acid and a remainder consisting essentially of methyl methacrylate and having average molecular weight in the range of about 3,000 to about 16,000, and (b) a caprolactam-blocked di- or triisocyanate, said isocyanate being present in sufficient quantity to provide about 0.90 to about 1.10 blocked isocyanate groups for each hydroxy group in said molding powder.

2. A molding powder in accordance with claim 1 wherein said copolymer contains between about 30 and about 36 weight percent of said mono-hydroxy ester.

3. A molding powder in accordance with claim 1 wherein said remainder consists essentially of a major amount of methyl methacrylate and a minor amount of methacrylonitrile.

4. A molding powder in accordance with claim 1 wherein said copolymer has average molecular weight in the range of about 6,000 to about 12,000 with less than about 5 percent of the molecules thereof having molecular weight below about 1,000.

5. A molding powder in accordance with claim 1 which contains between about 1.0 and about 10.0 weight percent of a hydroxylated diluent having molecular weight below about 1,000 and at least two free hydroxyl groups per molecule.

6. A molding powder in accordance with claim 1 wherein said molding powder mix contains about 0.95 to about 1.05 blocked isocyanate groups for each hydroxy group in the same.

7. A molding powder in accordance with claim 1 wherein said isocyanate is selected from triphenyl dimethylene triisocyanate and 4,4' - diphenyl methane diisocyanate.

8. A molding powder in accordance with claim 1 wherein said isocyanate is triphenyl dimethylene triisocyanate.

9. A molding powder in accordance with claim 1 wherein said isocyanate is 4,4' - diphenyl methane diisocyanate.

10. A molding powder which comprises an intimate mixture of (a) a copolymer consisting essentially of about 25 to about 40 weight percent of a monohydroxy ester of a $C_2 - C_3$ diol and acrylic or methacrylic acid and a remainder consisting essentially of a major proportion of methyl methacrylate and a minor proportion of methacrylo-nitrile or acrylonitrile and having average molecular weight in the range of about 3,000 to about 16,000, and (b) a caprolactam-blocked di- or tri- isocyanate, said isocyanate being present in sufficient quantity to provide about 0.90 to about 1.10 blocked isocyanate groups for each hydroxy group in said molding powder.

11. A molding powder in accordance with claim 10 wherein said copolymer contains between about 30 and about 36 weight percent of said monohydroxy ester.

12. A molding powder in accordance with claim 10 wherein said copolymer has molecular weight in the range of about 6,000 to about 12,000 with less than 5 percent of the molecules thereof having molecular weight below about 1,000.

13. A molded article having glass transition temperature above about 90° C., tensile strength above about 7,000 psi, tensile modulus above about 400,000 psi, and tensile elongation-to-break above 2 percent and formed from a molding powder which comprises an intimate mixture of (a) a copolymer consisting essentially of about 25 to about 40 weight percent of mono-hydroxy ester of a $C_2 - C_3$ diol and acrylic or methacrylic acid and a remainder consisting essentially of methyl methacrylate and having average molecular weight in the range of about 3,000 to about 16,000, and (b) a caprolactam-blocked di- or tri- isocyanate, said isocyanate being present in sufficient quantity to provide about 0.90 to about 1.10 blocked isocyanate groups for each hydroxy group in said molding powder.

14. A molded article in accordance with claim 13 wherein said monohydroxy ester comprises between about 30 and about 36 weight percent of said copolymer.

15. A molded article in accordance with claim 13 wherein said isocyanate triphenyl dimethylene triisocyanate.

16. A molded article in accordance with claim 13 wherein said isocyanate is 4,4' - diphenyl methane diisocyanate.

17. A molded article in accordance with claim 13 wherein said copolymer has molecular weight in the range of about 6,000 to about 12,000 with less than 5 percent of the molecules thereof having molecular weight below about 1,000.

18. A molded article having glass transition temperature above about 90° C., tensile strength above about 7,000 psi, tensile modulus above about 400,000 psi, and tensile elongation-to-break above about 2 percent and formed from a molding powder which comprises an intimate mixture of (a) a copolymer consisting essentially of about 25 to about 40 weight percent of a monohydroxy ester of a $C_2 - C_3$ diol and acrylic or methacrylic acid and a remainder consisting essentially of a major proportion of methyl methacrylate and a minor proportion of methacrylonitrile and having average molecular weight in the range of about 3,000 to about 16,000, and (b) a caprolactam-blocked di- or tri- isocyanate, said isocyanate being present in sufficient quantity to provide about 0.90 to about 1.10 blocked isocyanate groups for each hydroxy group in said molding powder.

19. A molded article in accordance with claim 18 wherein said monohydroxy ester comprises between about 30 and about 36 weight percent of said copolymer and said copolymer has molecular weight in the range of about 6,000 to about 12,000 with less than 5 percent of the molecules thereof having molecular weight below about 1,000.

20. A molded article in accordance with claim 18 wherein said isocyanate is selected from 4,4' - diphenyl methane diisocyanate and triphenyl dimethylene triisocyanate.

* * * * *